Patented May 18, 1948

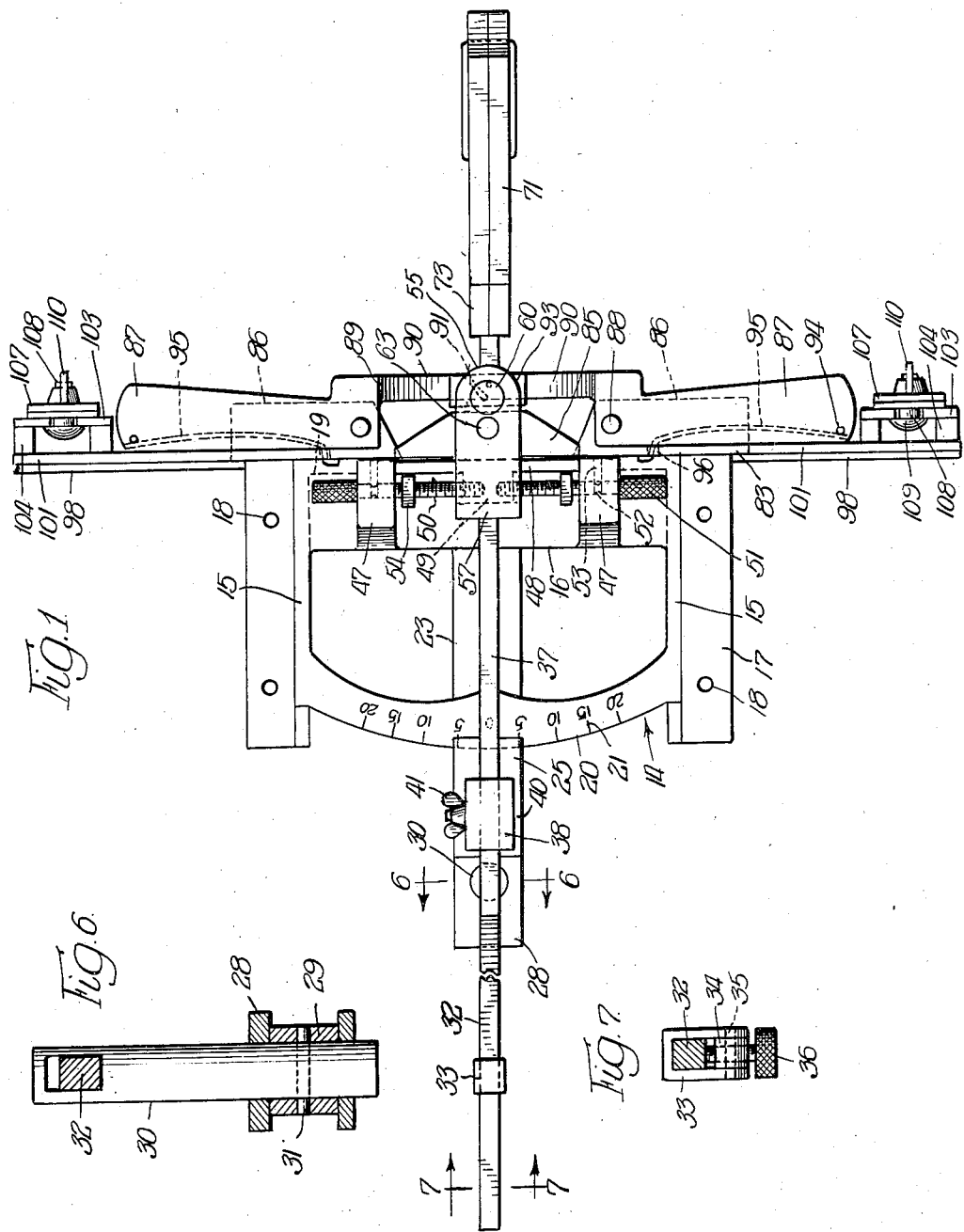

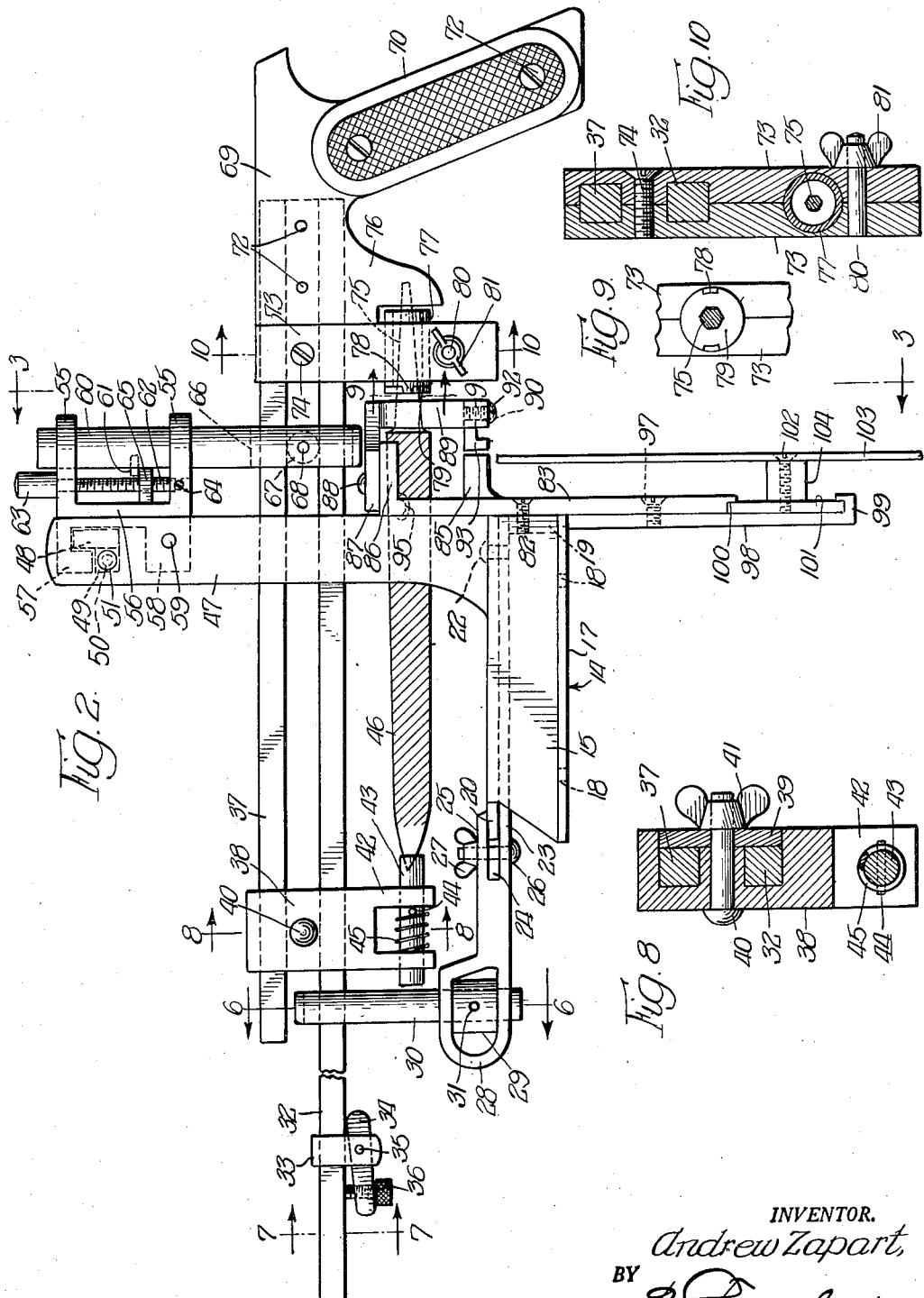

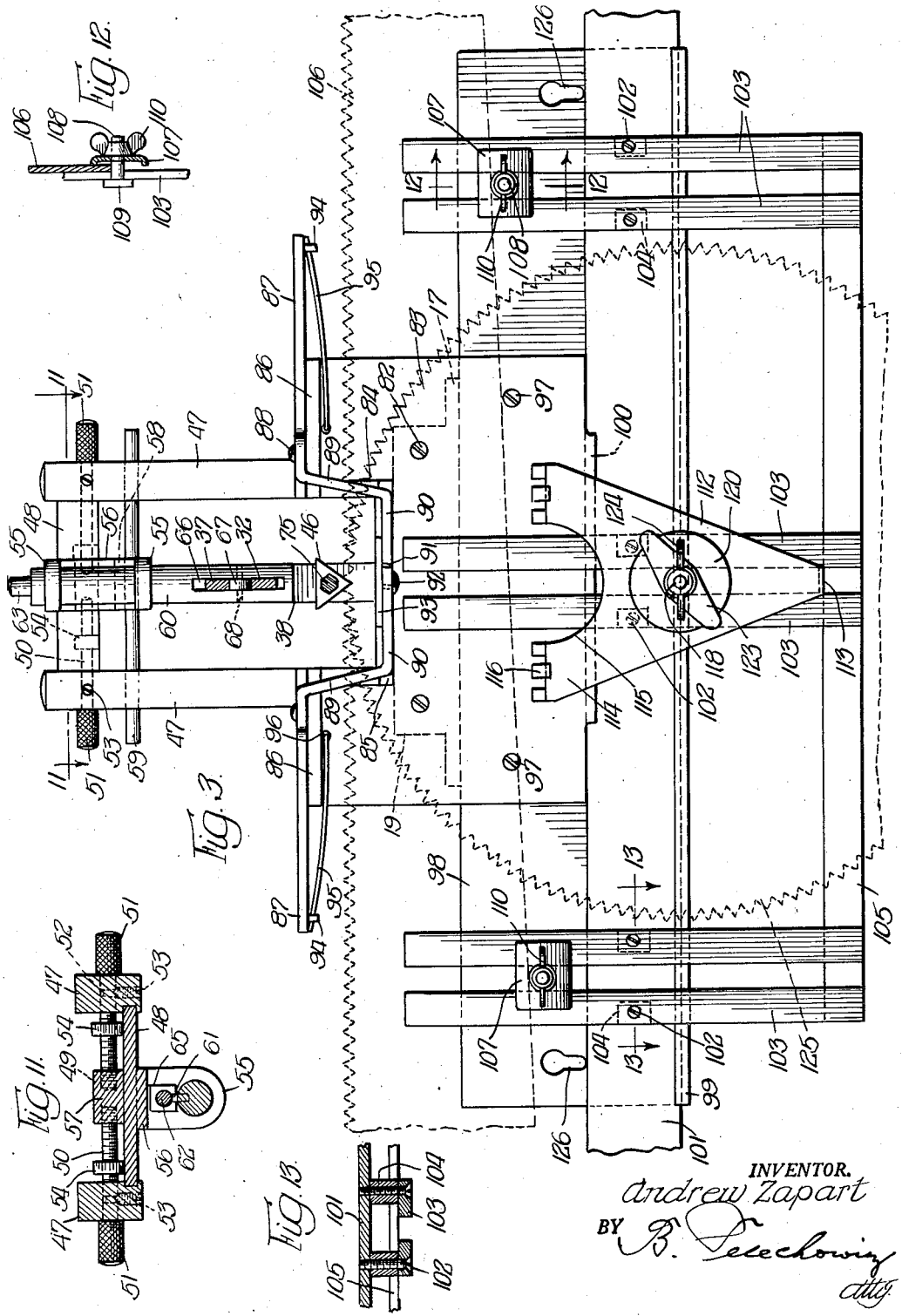

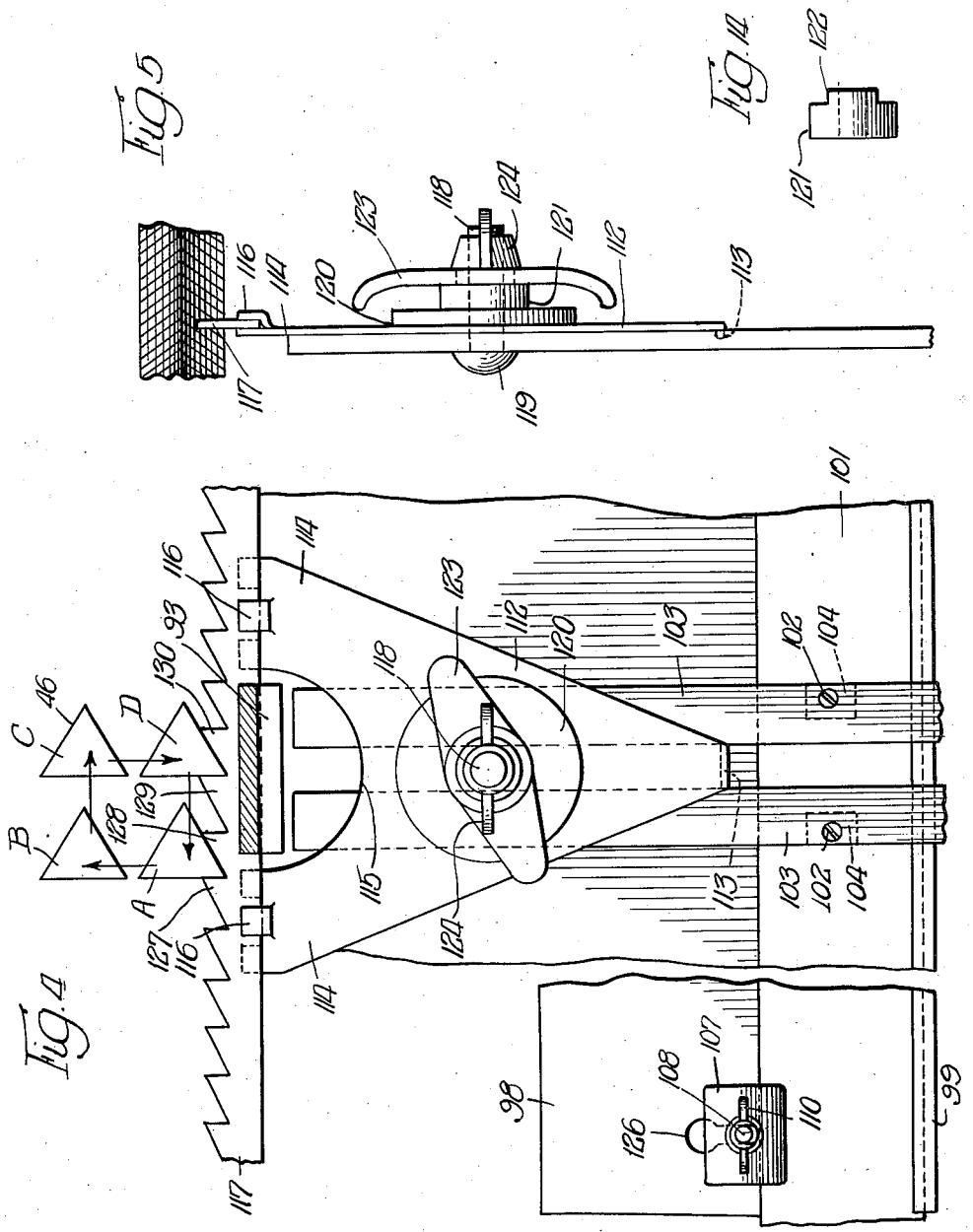

2,441,786

UNITED STATES PATENT OFFICE 2,441,786

SAW FILING DEVICE

Andrew Zapart, Brooklyn, N. Y.

Application July 5, 1946, Serial No. 681,474

8 Claims. (Cl. 76—31)

The present invention relates to saw filing devices and has for its main object the provision of efficient and comparatively simple means for regulating the degree of the depth of bite of a file into a saw in order that all filed saw teeth may be of uniform size.

Another object of the present invention is the provision of means in a saw filing device for limiting the movement of the file on horizontal plane in order to bring about proper, uniform spacing of filing operation with the resultant uniform spacing of the saw teeth on horizontal line.

A still further object of the present invention is the provision of means in a saw filing device whereby the file, after completion of filing operation upon one saw tooth may be lifted from the saw, then engaged with the adjacent tooth to be filed, and when so engaged the file may be shifted on a horizontal plane to bring the adjacent tooth to be filed to the position properly distanced from the preceding tooth before the filing operation is commenced.

A still further object of the present invention is the provision of means for guiding the file in its filing operation.

A still further object of the present invention is the provision of means for guiding the file angularly on vertical plane for lifting the file from the saw after completion of filing operation and for shifting the same downwardly to the saw preceding the filing operation, and for guiding the file on a horizontal plane for engaging a saw tooth and thereby shifting the saw a predetermined distance prior to the commencement of filing operation.

A still further object of the present invention is the provision of a suitable saw carrier in combination with the filing device for supporting thereon various types of saws, such as circular saw, hand saw and band saw.

A still further object of the present invention is the provision, in a saw filing device, of means for limiting the longitudinal movement of the file.

With the above general objects in view, and others that will appear as the invention is better understood, the same consists in the novel construction, combination and arrangement of parts hereinafter more fully described, illustrated in the accompanying drawing and pointed out in the appended claims.

In the drawings forming a part of this application, and in which like designating characters refer to corresponding parts throughout the several views:

Fig. 1 is a top elevational view of the present device;

Fig. 2 is a side elevational view thereof;

Fig. 3 is a front end elevational view thereof illustrating also the saw carrier while supporting a hand saw, the view having been taken substantially on line 3—3 of Fig. 2;

Fig. 4 is a front elevational view of a saw carrier for supporting a circular or a band saw, the view illustrating also various positions of the file preceding and during shifting operation of a band saw;

Fig. 5 is a side elevational view of a supporting member for supporting a circular or a band saw;

Fig. 6 is a cross-sectional view on line 6—6 of Figs. 1 and 2;

Fig. 7 is a cross-sectional view on line 7—7 of Figs. 1 and 2;

Fig. 8 is an enlarged cross-sectional view on line 8—8 of Fig. 2;

Fig. 9 is an enlarged cross-sectional view on line 9—9 of Fig. 2;

Fig. 10 is an enlarged cross-sectional view on line 10—10 of Fig. 2;

Fig. 11 is a cross-sectional view on line 11—11 of Fig. 3;

Fig. 12 is a cross-section on line 12—12 of Fig. 3;

Fig. 13 is a cross-section on line 13—13 of Fig. 3; and

Fig. 14 is a side elevational view of a collar employed for supporting a circular saw.

Referring to the present drawings there is shown therein supporting frame 14, including a pair of spaced side walls 15, and top wall 16, which rigidly connects with the upper edges of said side walls 15 and adjacent their front ends. Laterally extending from the lower edges of side walls 15 are wings 17, which are provided with a plurality of apertures 18 through which screws are passed for rigidly affixing frame 14 to a bench or other like support. Front wall 19 integrally formed with the front ends of said side walls 15, top wall 16 and wings 17 completes the structure of said frame 14.

Integrally formed with the rear ends of side walls 15 and extending from the upper edges thereof is an arcuate strip 20, which is in alinement with said top wall 16. Scale 21 running in both directions from the center of said strip 20, and representation of inch frictions, is made upon the upper face of said strip, for the purpose later described.

Pivotally affixed to the underface of top wall 16 by means of screw 22 is an oblong, flat arm 23 which is in contact with the lower face of said strip 20 and extends rearwardly thereof. The rear end of said arm 23 is considerably thicker and has recess 24 cut therein for providing lip 25 which overhangs said strip 20. Screw 26, passing the narrower body portion of said arm 23 and lip 25, rearwardly of said strip 20, with the engaging wing nut 27, constitutes the means for clamping lip 25 and arm 23 to strip 20 in the horizontal, angular adjusted position of said arm 23 upon its pivot 22, for the purpose hereinafter described. The rear end of said arm 23 terminates in eye 28. Receivable within said eye 28 is collar 29. Passing through said collar 29 and through the horizontal walls of said eye 28 is post 30. Pin 31 passing through said collar 29 and post 30 holds the two rigidly connected. The horizontal walls of said eye 28 prevent lateral shifting movement of said post 30, while collar 29, interposed between said horizontal walls of eye 28, and pin 31, prevent the upright shifting movement of said post 30. Post 30 is capable of making rotary movement, with collar 29.

Said post 30 constitutes a pivot for guiding bar 32, through which the latter extends adjacent the upper end thereof.

Set upon the rear end of guiding bar 32 is yoke 33, the side walls of which extend downwardly and beyond the lower edge of said guiding bar 32, to receive therewithin stop 34, which is maintained in a pivotal engagement with the side walls of said yoke 33 by pin 35. Set screw 36 passing through the rear end of said stop 34 is adapted to angularly shift the same upon pivot 35 for bringing the opposite end of said stop 34 into a strong frictional engagement with bar 32. Upon release of screw 36, yoke 33 may be longitudinally shifted upon bar 32. Said stop 34 constitutes means for limiting the shifting movement of bar 32 within post 30. When stop 34 comes in contact with post 30, further shifting movement of bar 32 is prevented.

Cooperating with guiding bar 32, and in a parallel vertical relation therewith and disposed above it, is another guiding bar 37, which is disposed above the upper termination of post 30. Set upon said guiding bars 32 and 37, adjacent the rear end of the latter and forwardly of post 30 is clamping member 38, provided with a pair of spaced recesses within which guiding bars 32 and 37 are receivable. Plate 39 fitting within a corresponding recess made in one side of said clamping member 38, frictionally contacts with the adjacent faces of said bars. Screw 40, passing through the body of said member 38 and between guiding bars 32 and 37, receives wing nut 41, by means of which plate 39 is maintained in a strong frictional contact with said guiding bars 32 and 37. Obviously, upon releasing wing nut 41, clamping member 38 may be shifted upon guiding bars 32 and 37, longitudinally thereof, for affixing the same to said bars in any adjusted position.

The lower end of said clamping member 38 is recessed for effecting a pair of spaced, downwardly depending leaves 42, which are in a transverse relation with said bars 32 and 37. Journaled within said leaves 42 for longitudinal shifting movement is rod 43 having pin 44 transversely passed therethrough and adjacent the front leaf 42. Set upon said rod 43 and interposed between the rear leaf 42 and said pin 44 is compressed coil spring 45, normally urging said rod toward file 46. The front end of said rod 43 is provided with a concentric, conical bore for receiving the adjacent, tapered end of file 46 as seen in Fig. 2.

Either affixed to, or integrally formed with top wall 16, and upwardly projecting therefrom is a pair of spaced standards 47, whose front faces are flush with the front wall 19 of frame 14. Affixed in any suitable manner to said standards 47, and interposed therebetween, adjacent their upper ends is a horizontal rail 48, which has an integrally formed and rearwardly depending projection 49, centrally of said rail 48. Freely journaled within each standard 47, as well as within said projection 49, is screw 50, the outer end of which has an enlarged, knurled knob 51, adjacent the outer side face of standard 47, by means of which screw 50 may be manually rotated. In order that either of said screws 50 may not become disengaged from its respective standard or from projection 49, each has a circumferential groove 52 made in the body portion reposing within standard 47, wherein inner end of screw 53 is received. Screws 53 permit rotary movement of screws 50, but prevent the longitudinal movement thereof. Set upon each screw 50, in a threaded engagement is nut 54, interposed between projection 49 and the adjacent standard 47. Each nut 54 contacts by one of its walls the adjacent wall of said rail 48, which arrangement prevents rotary movement of nuts 54, but permits their sliding movement toward or away from projection 49 when screws 50 are rotated by manual turning of knobs 51.

The means for supporting the front ends of guiding bars 32 and 37 and of the front end of file 46 and for permitting their angular shifting movement on horizontal plane, is composed of a suitable carriage which includes a pair of arms 55, alined and spaced on a vertical plane, and integrally formed with, and forwardly extending from upright 56. Overhanging said rail 48 and projection 49 is an L-shaped extension 57 which is integrally formed with, and rearwardly projecting from, the upper end of said upright 56. Integrally formed with the lower end of said upright 56, and rearwardly extending therefrom is lug 58, which is set upon pin 59 for free sliding movement thereon, said pin being passed through standards 47 within which the same is frictionally held. By virtue of the above arrangement said carriage is capable of free horizontal movement, the same being guided in that movement by pin 59, but is incapable of either vertical movement or angular movement on vertical plane, because said latter movements are prevented by pin 59 as well as by the engagement of extension 57 with rail 48.

The free ends of arms 55 are apertured to receive cylindrical post 60, which, intermediately of said arms, has a laterally projecting pin 61.

Passing through said arms 55, freely journaled therein for rotation, and rearwardly of post 60, is threaded shaft 62, terminating at its upper end in knurled knob 63, resting upon upper arm 55. The lower end of said shaft 62 is grooved to be engaged by screw 64, passed laterally of lower arm 55. Nut 65, in threaded engagement with shaft 62, remains in contact by one of its side faces with the adjacent face of upright 56. Nut 65 constitutes the means for limiting downward shifting movement of post 60, because, as pin 61 comes in engagement with said nut 65, further downward shifting movement of post 60 is prevented. To regulate the extent of the downward shifting movement of post 60, the position of nut 65 on vertical plane may be adjusted by rotating shaft 62 into one or opposite direction for lowering or elevating said nut 65, as is obvious.

Adjacent the lower end said post 60 is provided with an oblong, longitudinal recess 66, within which said bars 32 and 37 are accommodated, roller 67 being interposed between said bars 32 and 37 for facilitating their sliding movement within said recess. Said roller 67 is journaled upon pin 68.

The front ends of said guiding bars 32 and 37 are rigidly held within stock 69 from which handle 70 downwardly projects. Both said stock 69 and handle 70 are made of a pair of complementary plates 71 joined together by a plurality of screws 72, by means of which said front ends of said guiding bars 32 and 37 are firmly clamped within stock 69.

Disposed rearwardly of stock 69 is a pair of clamping plates 73, having complementary recesses for receiving said guiding bars 32 and 37 and wherein they are held in a firm clamped position by means of screw 74.

File 46, which is of triangular formation on transverse cross-section, has a reduced polygonal front end 75, gradually tapering towards its free end, the latter entering within a corresponding bore made in appendage 76 downwardly projecting from stock 69. Said reduced end 75 is located centrally and longitudinally of collar 77. The rear end of collar 77 has a pair of diametrically spaced, longitudinal projections 78, which are receivable within corresponding recesses made in the margin of disk 79. Thus, disk 79 is rigidly engaged with collar 77 and is prevented from making rotary movement independently of collar 77. Centrally said disk 79 is provided with a polygonal bore corresponding to the perimeter of end 75 at that point, thereby keying the same to disk 79 and collar 77. Collar 77 is receivable within semi-annular complementary bores made in clamping plates 73. Screw 80 and the engaging wind nut 81, the former passing through the lower ends of plates 73, firmly clamps said collar 77 normally preventing rotary or longitudinal movement thereof, thereby maintaining disk 79 as well as file 46 in their adjusted positions.

Spring 45 urging rod 43 towards file 46 also drives the reduced end 75 of said file 46 in engagement with disk 79 as well as within bore of appendage 76.

Affixed by means of screws 82 to the front wall 19 is plate 83, which extends above top wall 16 and is centrally recessed as at 84. Integrally formed with said plate 83, and within the lower margin of recess 84 is a horizontal, forwardly extending tongue 85, for the purpose later described. The upper end of said plate 83 on each side of recess 84 is provided with an integrally formed, and horizontally and forwardly extended ledge 86.

Each of said ledges 86 supports handle 87 pivoted upon screw 88 passing therethrough and engaging said ledge 86 adjacent the inner end thereof. Integrally formed with the inner end of each handle 87, and forwardly disposed with relation therewith is a downwardly projecting, inclined plate 89, with which horizontal jaw 90 is integrally formed. Each jaw 90 at its free end has an oblique edge 91. Said edges in the two jaws 90 are normally in contact as indicated by dotted lines in Fig. 1. Attached by means of screw 92 to that jaw 90 which has the maximum edge forwardly exposed, as seen in Fig. 1, is L-shaped lip 93, the horizontal portion of which overlies the free ends of said jaws 90, while the vertical portion of which skirts the rearward edges of said jaws 90 in spaced relation and remains in a horizontal, spaced alinement with the free edge of tongue 85. The recess formed by said tongue 85 and said lip 93 is adapted to receive the toothed edge of a saw as indicated in Figs. 2 and 3, for the purpose hereinafter stated.

The outer end of each handle 87 is provided with a downwardly projecting pin 94, rearwardly of which the outer end of wire spring 95 is engaged. The inner end of each spring 95 is passed through aperture 96 made in the upper end of plate 83 on each side of recess 84, and engaged to said plate 83 rearwardly thereof. Said springs 95 tend to urge the free ends of handles 87 forwardly, thereby urging the free ends of jaws 90 rearwardly and towards tongue 85. This action of springs 95 is incapable, however, to bring said jaws 90 in contact with tongue 85 because the vertical portion of lip 93, skirting the rear edges of jaws 90, prevents such result and maintains the same in a spaced relation with tongue 85.

Due to the oblique contacting edges 91 in the free ends of jaws 90 as well as by virtue of the fact that the vertical portion of lip 93 is in alinement with said jaws 90 on horizontal plane, manual pressure imparted to the free end of either handle 87, and against the action of springs 95, will cause the angular shifting movement of both jaws 90 away from tongue 85, as well as the shifting movement of said lip 93 away from said tongue, for the purpose of widening the recess between said tongue 85 and lip 93 for facilitating withdrawal of the toothed edge of a saw. This shifting movement of jaws 90 and of lip 93 is facilitated by the fact that the vertical portion of lip 93 is spaced from the rear edges of said jaws 90. Normally both tongue 85 and lip 93 contact with the opposite faces of a saw when within the recess defined by the two, the former constituting means against which the saw bears during filing operation when file 46 is shifted rearwardly, that is away from the operator, and the latter preventing undue vibration of a saw and the resultant faulty action of the file on the saw teeth during the filing operation. Of course, when the manual pressure upon handles 87 is released, jaws 90 and lip 93 assume normal operative position shown in Figs. 1 and 2, due to the action of said springs 95.

Attached to plate 83 by means of screws 97 is an oblong plate 98 having recessed flange 99. Portion of the lower edge of plate 83 is grooved as at 100. The recess of flange 99 and groove 100 are in a vertical alinement and constitute the means of mounting the saw carrier presently described.

Said saw carrier includes an oblong plate 101 receivable by its edges within recess in flange 99 and groove 100. Affixed to said plate 101 by means of screws 102 are three pairs of rails 103, arranged vertically and all on the same plane. Each rail 103 is maintained in a spaced relation from plate 101 by means of lug 104 interposed between said plate 101 and said rails 103. Screws 102 pass through said lugs 104, as seen in Fig. 13. Brace 105 rigidly engaging the lower ends of rails 103 constitutes an additional means for maintaining the latter in a rigid mutual relation.

For supporting hand saw 106, a pair of clamping plates 107 is provided each to coact with the outermost pairs of rails 103. Each of said clamping plates 107 cooperates with bolt 108 which is threaded at its free end. The opposite end of said bolt is integrally formed with head 109. The latter engages in contactual relation a pair of rails 103 adjacent their inner margins and along their rear faces, lugs 104 in each pair of rails 103 being sufficiently spaced to permit clearance for head 109, thereby permitting unobstructed shifting movement of bolt 108 and head 109 along the entire length of said rails 103. Wing nut 110, engaging the threaded end of bolt 108, maintains clamping plate 107 in a strong frictional engagement with saw 106 when the same is interposed between the front faces of rails 103 and clamping plates 107, as seen in Fig. 12.

Hand saws are usually made of tapering formation. To maintain the toothed edge of hand saw 109 in a horizontal plane, its lower edge is at an incline, with clamping plates 107 adjusted within the outermost pair of rails 103 to the lower free edge of the saw, as seen in Fig. 3, and thereupon clamped thereto by turning wing nuts 110 against plates 107.

For supporting either a circular saw 125 or a band saw 117 in the operative position for filing and upon the saw carrier hereinabove described a V-shaped supporting member 112 is provided. Said member 112 coacts with the innermost pair of rails 103. Its lower, narrower end is provided with a rearwardly turned tongue 113 which enters the space between said rails 103 and thereby constitutes a means for guiding said member 112 in its upright sliding movement along said rails 103 and for maintaining the upper end thereof on a horizontal line. The upper, wider end of said supporting member 112 is bifurcated effecting a pair of arms 114 with the resultant central recess 115. Each arm 114 has lug 116 struck out from its body portion and disposed away from, and forwardly of the plane of the body portion thereof for supporting the lower, smooth edge of band saw 117, as seen in Figs. 4 and 5.

Cooperating with said member 112 is a clamp including bolt 118 having head 119 integrally formed with its rear end, for engaging the pair of innermost rails 103, rearwardly thereof, as seen in Fig. 5. Disposed on said bolt 118, and forwardly of rails 103 is spacing washer 120. Receivable upon said bolt 118 is collar 121, provided at its front end with a flat boss 122. The latter receives an oblong clamping bar 123 having an oblong slot at its center for accommodating therewithin boss 122. Wing nut 124 is threaded engagement with the front end of bolt 118 urges the rearwardly turned ends of clamping bar 123 into a strong frictional contact with the front face of circular saw 125 when the latter is inserted by its central opening upon collar 121 and interposed between washer 120 and clamping bar 123. Washer 120 prevents circular saw 125 from contacting directly with support 112 or rather with lugs 116 and provides clearance past said lugs 116.

Support 112 is adapted to shift along the pair of central rails 103, either to or away from the recess defined by tongue 85 and lip 93 depending upon the width of band saw 117 or the diameter of circular saw 125. When filing operation is to be performed on a circular saw of a comparatively large diameter, bolts 108 and clamping plates 107 may be removed from the outermost pair of rails 103, or if desired said bolts 108 may be inserted within slots 126 made adjacent the ends of plate 98 and in the proximity of the upper edge of plate 101 for effecting engagement of plates 107 with the upper edges of plate 101 as is seen in Fig. 4. This will constitute additional means for anchoring plate 101 to plate 98. The upper ends of slots 126 are enlarged for permitting free insertion therethrough of heads 109.

When hand saw 106 undergoes filing operation, supporting member 112 is lowered upon the innermost pair of rails 103, as seen in Fig. 3, the same may be shifted until head 119 comes in contact with brace 105. Or the same may be entirely removed from the saw carrier either by disconnecting wing nut 124 from bolt 118, and thereupon removing clamping bar 123, collar 121, washer 120, support 112 and bolt 118, in succession, from the innermost pair of rails 103. Or, if preferred, the saw carrier may be removed from its engagement with plates 83 and 98 by longitudinally shifting plate 101 until the same is freed from recessed flange 99 and groove 100, and thereupon support 112 may be bodily removed from the carriage by shifting the same upwardly until bolt 118 is freed from the pair of rails 103 within which the same has reposed. Thereupon, reinsertion of plate 101 within flange 99 and groove 100 will recondition the said carrier to support hand saw 106 by clamping plates 107, with the carrier unobstructed by support 112 and its appurtenances.

It is noted that when a circular saw is set upon collar 121, and clamped to washer 120 by clamp 123, both said washer 120 and lugs 116 will be in the way for the saw to remain in a perfect alinement with recess defined by tongue 85 and lip 93. Slight bending of the circular saw while the same is shifted upwardly with support 112, in order to guide the same within said recess, will cause the toothed edge of a circular saw to enter said recess and remain therewithin when wing nut 124 is tightened. Lip 93, bearing against the front face of a circular saw, and adjacent the toothed edge thereof, will tend to maintain the same in the operative position within said recess during the filing operation. The bending aforesaid will not be unduly interferred with by said lugs 116, because said lugs 116 will be removed a comparative distance from the toothed edge of a circular saw, particularly of a standard size, as visualized in Fig. 3, thereby permitting yielding of the saw, particularly when it is considered that arms 114 themselves will yield into a rearward direction when under the yielding pressure of the saw upon said lugs 116, by virtue of pressure exerted upon the saw by clamp 123.

From the hereinabove description it will be seen that the function of rod 43 is to support the adjacent end of file 46, and to hold the reduced end 75 thereof in engagement with disk 79. Since said rod 43 is longitudinally yielding due to the action of spring 45, files of variable lengths may be inserted between appendage 76 and rod 43, to be supported thereby in a longitudinal position. To accommodate files of greater or smaller lengths clamping member 38 may be shifted upon bars 32 and 37 to or away from handle 70.

To adjust file 46 transversely of the longitudinal axis thereof in order that the operative filing edge thereof may be in a proper angle with relation to the saw teeth, as suggested by the two positions of file 46 in Figs. 3 and 4, wing nut 81 is loosened for permitting rotary adjustment of collar 77, thereby rotatably shifting disk 79 and file 46 therewith. On tightening wing nut 81 collar 77 will be held in a strong frictional, adjusted position with clamping plates 73, thereby maintaining disk 79 and file 46 in their adjusted position.

The degree of bevel of the saw teeth to be filed is regulated by the position of pivot 30 with relation to strip 20, as well as by nuts 54. On loosening wing nut 27, arm 23 with lip 25 may be angularly shifted along scale 21, thereby adjusting the rear ends of guiding bars 32 and 37, and consequently the rear end of file 46, angularly with relation to the plane of the saw remaining within recess defined by tongue 85 and lip 93. The three will be maintained in that adjusted position by virtue of the engagement of guiding bar 32 with post 30. The front ends of said guiding bars 32 and 37 and of file 46 are angularly adjusted on horizontal plane by nuts 54. Each nut 54 constitutes a stop guide for carriage 55—55—56, by virtue of contact therewith by L-shaped extension 57. When said contact is maintained file 46 when longitudinally shifted during the filing operation will be guided in a straight line by virtue of the connection of file 46 with said carriage through the medium of bars 32 and 37 and post 60. When during the filing operation handle 70 is downwardly pressed and rearwardly shifted away from the operator, with pressure exerted thereupon for instance to the left direction, left nut 54, as seen in Figs. 3 and 11 will then be contacted by extension 57, preventing further lateral movement of the carriage toward the left, thereby guiding file 46 in a straight, predetermined line for filing uniform bevel in all saw teeth to be filed.

There is another function for said nuts 54, namely, they provide guides for angular shifting of file 46 for the purpose of engaging saw teeth, on completion of filing operation upon a pair of adjacent teeth, for bodily shifting the saw for bringing the adjacent pair of teeth to be filed in proper relation with file 46 preceding the filing operation thereon. Reference is had to Fig. 4 wherein file 46 is shown in four positions, A, B, C, and D. Let it be assumed that position A of file 46 is immediately after said file has completed the filing operation upon teeth 127 and 128 along their adjacent slanting edges, and it is desired to bring teeth 129 and 130 to the position of teeth 127 and 128, respectively, preparatory to the commencement of the filing operation upon the adjacent edges of said teeth 129 and 130. To accomplish this object, file 46 is angularly shifted on a vertical plane to position B, thereupon angularly shifted on horizontal plane to position C. Said latter position is predetermined with relation to the teeth distances and regulated by adjustment of right nut 54. The latter preventing further shifting of file 46 to the right. From position C file 46 is shifted directly downwardly exerting manual pressure on handle 70 to the right for guiding downward shifting of file 46 on vertical plane, as determined by the adjustment of the right nut 54 for bringing said file into recess between teeth 129 and 130, or position D of file 46. When in that latter position, file 46 engage tooth 129 and bears thereagainst. Shifting the file to the left on horizontal plane from position D, the file, due to its engagement with tooth 129 shifts bodily saw 117 until file 46 comes to position A with teeth 129 and 130 assuming the position of teeth 127 and 128 theretofore held by the latter. Of course the extent of that latter shifting of file 46 is regulated by the adjustment of the left nut 54 as already mentioned. In the example given teeth of saw 117 were so shifted as to omit the recess between teeth 128 and 129, as is required in cross-cut saws. The shifting of saw by the operation of file 46 will be accomplished with equal facility on hand, band or circular saw. The latter instead of shifting will simply make rotary movement on collar 121.

Post 30, due to its pivotal connection with arm 23, through collar 29 and eye 28, and its engagement with guiding bar 32, permits pivotal, angular shifting of file 46 on horizontal plane.

The recess in post 30 within which bar 32 is accommodated, as well as recess 66 in post 60, within which bars 32 and 37 are accommodated, are both longer than the vertical width of the respective bars accommodated therewithin, thereby permitting angular shifting of said bars on vertical plane when file 46 is lifted away from the saw on completion of the filing stroke. Post 60, being free to move within arms 55, to the extent permitted by pin 61, allows considerable angular shifting movement of file 46 on vertical plane.

The function of pin 61 and nut 65 is to regulate and predetermine the extent of the depth of file's bite into the saw during its filing operation. By rotating shaft 62 into one or the opposite direction nut 65 is shifted upwardly or downwardly. During inception of the filing operation pin 61 will be disposed above nut 65, and when the filing action has been completed, and file 46 has bitten into the saw metal to the fullest extent permitted by pin 61, said pin 61 will then contact said nut 65 preventing further biting into the saw. By this means the depth of all recesses and all teeth in the saw will be of uniform depth.

Bars 32 and 37 and file 46 are mutually interconnected through stock 69 and clamps 38 and 73, so that when handle 70 is shifted either vertically or laterally all said parts shift bodily and simultaneously.

The filing operation takes place when handle 70 is pressed downwardly and laterally to engage L-shaped extension 57 with one of the two nuts 54 for guiding file 46 on a straight line, and file 46 is shifted away from the operator or towards post 30. File 46, riding upon the saw teeth during filing operation will tend to press the adjacent body portion of the saw below its teeth to tongue 85. The latter acts as a rearward support for saw during filing operation. Any vibration of the saw due to its tendency to spring away from tongue 85 will be prevented or minimized by lip 93.

So as to save the operator considerable degree of lost motion, which otherwise would ensue, by unnecessarily longitudinally shifting file 46 into one or the opposite direction, yoke 33 and stop 34, when the latter comes in contact with post 30, provide means for limiting shifting movement of file forwardly or towards the operator. The lower ends of clamping plates 73 coming in contact with jaws 90 constitute means for limiting the shifting movement of file 46 rearwardly, away from the operator, when file is used in the saw filing operation. Stop 34 may of course be adjusted longitudinally upon bar 32 depending upon the length of file 46.

From the hereinabove description it will be apparent that the degree of bevel of the teeth is determined by the angular adjustment of arm 23 upon its pivot 22. When said arm 23 is adjusted to a desired angle as predetermined by the degree of bevel upon the saw teeth desired to be cut by the file, then wing nut 27 is tightened to rigidly connect said arm 23 with strip 20. As seen in Figs. 1 and 3, arm 23 being in a substantially perpendicular relation with saw 106, the bevel to be cut upon the saw teeth by file 46 will be at right angle with relation to the longitudinal axis of the saw. Arm 23 is adjustable on strip 20 in either direction from the center of the latter, thereby permitting filing operation upon saw teeth regardless whether the teeth are turned to the right or left. Cooperating with the right or left position of arm 23, and consequently of post 30, is right or left nut 54, respectively, for laterally supporting file 46 on one or opposite side thereof. Of course, when post 30 is on the left of the center of strip 20, as viewed from the point of vision of the operator, right nut 54 constitutes the lateral guiding support for the file, and vice versa.

The pitch to be cut into the saw teeth is regulated by the means for rotatable adjustment of file 46, including collar 77, disk 79 and clamp 73—73. The various file adjustments transversely of the longitudinal axis of file 46 are suggested by two positions of the file shown in Figs. 3 and 4.

The means for regulating the depth of the cut by the file into the saw includes pin 61 and nut 65.

While there is described herein preferred embodiments of the present invention, it is nevertheless to be understood that minor changes may be made therein without departing from the spirit and scope of the invention as claimed.

What I claim as new is:

1. A saw filing device comprising a file, a frame, means for supporting a saw in a substantially transverse relation with said file, a guiding bar rigidly affixed to said file and in a spaced relation therewith, means for supporting said guiding bar adjacent one end of said file, said means being angularly adjustable with relation to the longitudinal axis of the saw for determining the angle of bevel to be cut in the teeth thereof by said file, a pair of standards supported by said frame, a carriage supported by said standards, said guiding bar being supported by said carriage adjacent the opposite end of said file, said carriage being adapted for shifting movement to one or the other of said standards along a path substantially parallel with the longitudinal axis of the saw, and means for limiting the shifting movement of said carriage in either direction for maintaining said file during the filing operation thereof along the path coincidental with the angle of bevel as determined by the angular adjustment of said second named means.

2. A saw filing device comprising a file, a frame, means for supporting a saw in a substantially transverse relation with said file, a guiding bar rigidly affixed to said file and in a spaced relation therewith, means for supporting said guiding bar adjacent one end of said file, said means being angularly adjustable with relation to the longitudinal axis of the saw for determining the angle of bevel to be cut in the teeth thereof by said file, a pair of standards supported by said frame, a carriage supported by said standards, said guiding bar being supported by said carriage adjacent the opposite end of said file, said carriage being adapted for shifting movement to one or the other or said standards along a path substantially parallel with the longitudinal axis of the saw, and means for limiting the shifting movement of said carriage in either direction for maintaining said file during the filing operation thereof along the path coincidental with the angle of bevel as determined by the angular adjustment of said second named means, said last named means including a pair of stops, one on each side of said carriage, said stops being adjustable to or away from said standards.

3. In a saw filing apparatus, having a frame, a file, and a saw supporting member for supporting a saw in a substantially transverse relation with said file, a device for regulating the depth of the teeth to be made in the saw by the file during the filing operation of the latter, comprising a guiding bar affixed to said file and in a spaced reltion therewith, a post, said post being provided with a recess within which said bar is receivable for longitudinal shifting movement, a carriage supported by said frame, said post being receivable by said carriage, said post being adapted for sliding movement in said carriage to or away from the saw, and means in said carriage limiting the extent of the sliding movement of said post toward said saw.

4. A saw filing device comprising a file, means for supporting a saw in a substantially transverse relation with said file, a guiding bar rigidly affixed to said file in a spaced relation therewith, means for pivotally supporting said guiding bar adjacent one end of said file, said means being adjustable in a longitudinal relation with the saw, a pin rigidly supported in a substantially parallel relation with the longitudinal axis of the saw, and a carriage supported by said pin for a longitudinal shifting movement thereon, said guiding bar being supported by said carriage adjacent the opposite end of said file said second named means and said carriage as the same is shifted upon said pin coacting for determining the angle of bevel in the teeth of the saw to be cut by said file.

5. A saw filing device comprising a file, means for supporting a saw in a substantially transverse relation with said file, a guiding bar rigidly affixed to said file in a spaced relation therewith, means for pivotally supporting said guiding bar adjacent one end of said file, said means being adjustable in a longitudinal relation with the saw, a pin rigidly supported in a substantially parallel relation with the longitudinal axis of the saw, a carriage supported by said pin for a longitudinal shifting movement thereon, said guiding bar being supported by said carriage adjacent the opposite end of said file, and means for limiting the shifting movement of said carriage in either direction, said second and said last named means coacting for predetermining the angle of bevel in the teeth of the saw to be cut by said file.

6. A saw filing device comprising a file, means for supporting a saw in a substantially transverse relation with said file, a guiding bar rigidly affixed to said file in a spaced relation therewith, means for pivotally supporting said guiding bar adjacent one end of said file, said means being adjustable in a longitudinal relation with the saw, a pin rigidly supported in a substantially parallel relation with the longitudinal axis of the saw, a carriage supported by said pin for a longitudinal shifting movement thereon, said guiding bar being supported by said carriage adjacent the opposite end of said file, and a pair of adjustable stops, one adjacent each end of said pin, said second named means and said stops predetermining the angle of bevel in the teeth of the saw to be cut by said file.

7. A saw filing device comprising a file, means for supporting a saw in a substantially transverse relation with said file, a guiding bar rigidly affixed to said file in a spaced relation therewith, a post pivotally supporting said guiding bar adjacent one end of said file, said post being adjustable in a longitudinal relation with the saw, a pin rigidly supported in a substantially parallel relation with the longitudinal axis of the saw, a carriage supported by said pin for a longitudinal shifting movement thereon, said guiding bar being supported by said carriage adjacent the opposite end of said file, and means adjacent the end of said pin for limiting the shifting movement of said carriage, said post and said means determining the angle of bevel in the teeth of the saw to be cut by said file.

8. A saw filing device comprising a file, means for supporting a saw in a substantially transverse relation with said file, a guiding bar rigidly affixed to said file in a spaced relation therewith, a post pivotally supporting said guiding bar adjacent one end of said file, said post being adjustable in a longitudinal relation with the saw, a pin rigidly supported in a substantially parallel relation with the longitudinal axis of the saw, a carriage supported by said pin for a longitudinal shifting movement thereon, said guiding bar being supported by said carriage adjacent the opposite end of said file, said post and said carriage permitting longitudinal sliding movement of said guiding bar, and adjustable means adjacent the end of said pin for limiting the shifting movement of said carriage, the adjustment of said post in a longitudinal relation with the saw and the adjustment of said means predetermining the angle of bevel in the teeth of the saw to be cut by said file.

ANDREW ZAPART.

REFERENCES CITED

The following references are of record in the file of this patent:

UNITED STATES PATENTS

| Number | Name | Date |
|---|---|---|
| 35,935 | Hawley | July 22, 1862 |
| 409,866 | Penrose | Aug. 27, 1889 |
| 424,724 | Penrose | Apr. 1, 1890 |
| 527,332 | Howard | Oct. 9, 1894 |
| 566,003 | Mitchell | Aug. 18, 1896 |
| 648,932 | Duquemin | May 8, 1900 |
| 847,804 | McAulay | Mar. 19, 1907 |
| 910,893 | Becker | Jan. 26, 1909 |
| 1,087,373 | Holmes | Feb. 17, 1914 |
| 1,728,393 | Collier | Sept. 17, 1929 |
| 1,923,445 | Loibl | Aug. 22, 1933 |
| 1,994,332 | Baze | Mar. 12, 1935 |
| 2,310,517 | Collier | Feb. 9, 1943 |
| 2,323,527 | Ewers | July 6, 1943 |

FOREIGN PATENTS

| Number | Country | Date |
|---|---|---|
| 67,620 | Switzerland | Feb. 19, 1914 |
| 84,300 | Sweden | Sept. 11, 1935 |